US006914969B2

(12) United States Patent
Creamer et al.

(10) Patent No.: US 6,914,969 B2
(45) Date of Patent: Jul. 5, 2005

(54) SERVICE LOGIC EXECUTION ENVIRONMENT FOR TELECOMMUNICATIONS SERVICE COMPONENTS

(75) Inventors: Thomas E. Creamer, Boca Raton, FL (US); Samuel Kallner, Yaakov (IL); Victor S. Moore, Boynton Beach, FL (US); Gal Shachor, Yokneam (IL); Pnina Vortman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 09/884,577

(22) Filed: Jun. 18, 2001

(65) Prior Publication Data

US 2002/0191772 A1 Dec. 19, 2002

(51) Int. Cl.[7] ............................................. H04M 3/42
(52) U.S. Cl. ............................ 379/201.03; 379/201.05; 379/221.08
(58) Field of Search ........................ 379/201.01, 201.02, 379/201.03, 201.05, 221.08, 221.09, 221.12, 230

(56) References Cited

U.S. PATENT DOCUMENTS

| | | | | |
|---|---|---|---|---|
| 5,436,957 A | * | 7/1995 | McConnell | 379/88.23 |
| 5,517,562 A | * | 5/1996 | McConnell | 379/201.03 |
| 5,864,668 A | | 1/1999 | Andert et al. | |
| 5,991,803 A | * | 11/1999 | Glitho et al. | 709/220 |
| 6,016,499 A | | 1/2000 | Ferguson | |
| 6,018,737 A | * | 1/2000 | Shah et al. | 707/10 |
| 6,075,854 A | * | 6/2000 | Copley et al. | 379/207.14 |
| 6,081,533 A | | 6/2000 | Laubach et al. | |
| 6,115,719 A | | 9/2000 | Purdy et al. | |
| 6,243,453 B1 | * | 6/2001 | Bunch et al. | 379/201.01 |
| 6,445,782 B1 | * | 9/2002 | Elfe et al. | 379/201.01 |
| 6,466,570 B1 | * | 10/2002 | Low et al. | 370/352 |
| 6,526,131 B1 | * | 2/2003 | Zimmerman et al. | 379/106.09 |

OTHER PUBLICATIONS

W. Seigneur, *The Open Architecture Distributed Switching Model, Building the Network Operating System for the Information Superhighway*, SONeTech, Inc. <http://www.sonetech.com/conferences/nfoec94.html>.

Keijzer, et al., *JAIN: A New Approach to Services in Communication Networks*, pp. 94–99, IEEE Communications Magazine, (Jan. 2000).

Jain, et al., *Java Call Control, Coordination, and Transactions*, pp. 108–114, IEEE Communications Magazine, (Jan. 2000).

Beddus, et al., *Opening Up Networks with JAIN Parlay*, pp. 136–143, IEEE Communications Magazine, (Apr. 2000).

Bhat, et al., *JAIN Protocol APIs*, pp. 100–107, IEEE Communications Magazine, (Jan. 2000).

(Continued)

*Primary Examiner*—Bing Q. Bui
(74) *Attorney, Agent, or Firm*—Akerman Senterfitt

(57) ABSTRACT

A service logic execution environment (SLEE) for telecommunications services. The SLEE can include a class loader for loading service components in the SLEE, and an event routing bus for receiving events from the protocol layer and other service components. The SLEE can register each loaded service component to receive events directed to particular registered service components. Subsequently, the event routing bus can route received events to the particular registered service components executing in the SLEE. The event routing bus can be further configured to receive events from application components which are external to the SLEE and the protocol layer. The SLEE also can include a thread pool; and, a thread pool management component for allocating threads in the thread pool for use by the loaded service components.

15 Claims, 3 Drawing Sheets

OTHER PUBLICATIONS

S. Silberstang, *Service Creation for Advanced Intelligent Networks Utilizing Intelligent Peripherals*, (Mar. 2001) <http://www.amarex.com/service.html>.

Keijzer, et al., *The Telephony Interoperability Challenge*, Sun Journal, (Mar. 2001) <http://www.sun.com/dot-com/sunjournal/v3n2/Telephony.html>.

JAIN™: *Integrated Network APIs for the JAVA™ Platform*, (Sep. 2000) <http://www.java.sun.com/products/jain/>.

JAIN™ SCE/SLEE API Specification, (Mar. 2001) <http://www.javasoft.com/aboutJava/communityprocess/jsr/jsr_022_jsce.html.>.

* cited by examiner

SERVICE LOGIC EXECUTION ENVIRONMENT FOR TELECOMMUNICATIONS SERVICE COMPONENTS

BACKGROUND OF THE INVENTION

1. Technical Field

This invention relates to the field of telecommunications services and more particularly to service logic execution environments for telecommunications service providers.

2. Description of the Related Art

The development of the open network application programming interface (API) represents an important departure from traditional methods for opening the architecture of the public switched telephone network (PSTN). One such open network API, the Advanced Intelligent Network (AIN) API and architecture, defines a call model which allows the creation of telecommunications service applications outside of the switch environment. Telecommunications service applications are a'la carte telecommunications applications which can perform enhanced services for a telecommunications session established among two or more parties. Exemplary services applications can include Call Waiting, Caller ID, Call Forwarding, Voice Activated Dialing, and Meet-me Conferencing.

When AIN first had been introduced, in terms of the service application creation process, the AIN architecture represented an important advance. AIN separated service development from switching, allowing service logic components to be developed more quickly and placed in specialized network elements attached to databases. Switches, in turn, being free from all service logic, could be optimized for speed and efficiency. Still, typical service applications developed to the AIN specification are written in specialized languages by specially trained programmers using specialized service creation environments.

Importantly, future telecommunications networks will be characterized by new and evolving network architectures where packet-switched, circuit-switched, and wireless networks are integrated to offer subscribers an array of innovative multimedia, multiparty applications. Equally important, it is expected that the process by which telecommunications applications are developed will change, and will no longer solely be the domain of the telecommunications network or service application provider. In fact, in order to provide a broad portfolio of novel, compelling applications rapidly, service application providers will increasingly turn to third-party applications developers and software vendors. Thus, application development in the telecommunications domain will become more similar to that in software and information technology in general, with customers reaping the benefits of increased competition, reduced time to market, and the rapid leveraging of new technology as it is developed.

To make this vision a reality, the principles of AIN have been discarded in favor of a new service application component development paradigm. Specifically, it has been recognized that future integrated networks must offer application developers a set of standard, open APIs so that applications written for compatibility with one vendor's system can execute in the system of another vendor. In consequence, the cost of applications development can be amortized, reducing the final cost to the customer. Java APIs for Integrated Networks (JAIN) fulfills the requirements of the new service application component development paradigm. Presently, JAIN includes standard, open, published Java APIs for next-generation systems consisting of integrated Internet Protocol (IP) or asynchronous transport mode (ATM) networks, PSTN, and wireless networks. The JAIN APIs include interfaces at the protocol level, for different protocols such as Media Gateway Control Protocol (MGCP), Session Initiation Protocol (SIP), and Transactional Capabilities Application Part (TCAP), as well as protocols residing in the higher layers of the telecommunications protocol stack.

JAIN includes a set of integrated network APIs for the Java platform and an environment to build and integrate JAIN components into services or applications that work across PSTN, packet and wireless networks. The JAIN approach integrates wireline, wireless, and packet-based networks by separating service-based logic from network-based logic. FIG. 1 illustrates a conventional JAIN implementation. As shown in FIG. 1, a conventional JAIN implementation can include a protocol layer 102 which can include interfaces to IP, wireline and wireless signaling protocols. These protocols can include TCAP, ISUP, INAP, MAP, SIP, MGCP, and H.323. The JAIN implementation also can include a signaling layer 103 which can include interfaces to provide connectivity management and call control. The conventional JAIN implementation also can include an application layer 104 for handling secure network access and other external services. Finally, the conventional JAIN implementation can include a service layer 106 which can include a service creation and carrier grade service logic execution environment (SLEE) 108.

In JAIN, the protocol layer 102 and the signaling layer 103 are based upon a Java standardization of specific signaling protocols and provide standardized protocol interfaces in an object model. Additionally, applications and protocol stacks can be interchanged, all the while providing a high degree of portability to the applications in the application layer using protocol stacks from different sources. By comparison, the application layer 104 provides a single call model across all supported protocols in the protocol layer 102. Fundamentally, the application layer 104 provides a single state machine for multiparty, multimedia, and multiprotocol sessions for service components in the application layer 104. This state machine is accessible by trusted applications that execute in the application layer 104 through a call control API.

Notably, applications or services executing at the service level 102 can communicate directly with protocol adapters in the SLEE 108. Protocol adapters typically are class methods, callbacks, event or interfaces that encapsulate the underlying resources such as TCAP, MGCP, etc. The underlying resources can be implemented in many programming languages, but a JAIN-conformant protocol product must provide at least the relevant JAIN API. In contrast, an external application or service executing in the application layer 104 does not have to be aware of the underlying resources and can remain oblivious to the fact that some of its session or call legs may be using different protocols.

Service components 112 are the core JAIN components and can execute in the SLEE 108. More particularly, service components 112 are constructed according to a standard component model and, instantiations of component assemblies execute in coordination with the SLEE 108. Using information regarding the protocol layer 102 which can be incorporated into the SLEE 108, service components 112 can interact with the underlying protocol stacks without having specific knowledge of the protocol stack. Thus, service components 112 can use the call model provided by the signaling layer to implement telephony services. More importantly, the SLEE 108 can relieve the service components 112 of conventional lifecycle responsibilities by providing portable support for transactions, persistence, load balancing, security, and object and connection instance pooling. In this way, the service components 112 can focus on providing telephony services.

Despite the apparent advantages of the JAIN specification, however, conventional implementations of the JAIN specification to date are deficient, particularly in their application to real-time telephony. First, the SLEE of conventional JAIN implementations can incorporate an Enterprise Javabean™ (EJB) approach which includes unnecessary system housekeeping chores, for example lifecycle responsibilities. Lifecycle responsibilities, however, are not as critical in the real-time telephony domain as they are in other communications domains. Thus, the use of EJBs can introduce too many latencies to satisfy the demands of real time operations. More importantly, however, in order to relieve service components of the complexities of the protocol stacks, conventional SLEEs require specific knowledge of the underlying protocol layer.

For instance, including protocol stack information in the SLEE itself during development can add unnecessary complexity to the SLEE. From a lifecycle maintenance perspective this can be problematic. Also, including protocol stack information in the SLEE unnecessarily binds the SLEE to particular underlying protocols. Should it become important to incorporate a new protocol stack in the system, new code must be added to the SLEE. Finally, conventional implementations of the SLEE according to the JAIN specification only permit service components executing therein to receive and respond to events from the protocol layer. More importantly, in a conventional implementation of the SLEE, service components executing in the SLEE cannot communicate with one another.

SUMMARY OF THE INVENTION

The present invention is a service logic execution environment (SLEE) for use in an intelligent network model having an application layer and a protocol layer. For example, the SLEE can implement a JAIN Service Logic Execution Environment (JSLEE) interface. The present invention solves the deficiencies of the prior art by providing more direct processing of events by the service components and by reducing protocol stack specific code contained in the SLEE. A SLEE which has been configured in accordance with the inventive arrangements can include a class loader for loading service components in the SLEE, and an event routing bus for receiving events from the protocol layer and other service components.

In accordance with the inventive arrangements, at least one of the service components can contain a protocol stack for managing communications in a communications network. In this way, it is possible for the SLEE to be entirely devoid of protocol stack code where the protocol stack code is included within service components. In one aspect of the present invention, each service component can include at least one service instance; and, a service wrapper for providing an interface to the at least one service instance. Moreover, in another aspect of the present invention, each service component can include a deployment descriptor for providing configuration information to the SLEE. Importantly, the SLEE can use the deployment descriptor to properly configure the service component when the service component is loaded for execution in the SLEE.

Notably, the SLEE can register each loaded service component to receive events directed to particular registered service components. Subsequently, the event routing bus can route received events to the particular registered service components executing in the SLEE. Significantly, in a further aspect of the present invention, the event routing bus can be further configured to receive events from application components which are external to the SLEE and the protocol layer.

In one aspect of the present invention, the SLEE also can include a thread pool; and, a thread pool management component for allocating threads in the thread pool for use by the loaded service components. In particular, the thread pool can be a collection of threads which have been pre-created for use by service components in the SLEE. As a result, service components can utilize pre-created threads on demand. When the service components no longer require use of allocated threads, complex tear-down of the threads need not be performed. Rather, the thread merely can be deallocated from use by the service component and the thread can be returned to the thread pool. The SLEE also can include other facilities besides the thread pool. For example, the SLEE can include at least one timer for use by service components in the SLEE. Also, the SLEE can include at least one usage counter. The usage counter can be used by the service logic instances in order to record service request response metrics such as the number of calls processed or the time taken to process a call.

A method for routing events in a SLEE can include receiving at least one event from a service component executing in the SLEE; and, routing each received event to a service component which has registered with the SLEE to receive the routed event. The receiving step also can include receiving at least one event from an application component which is external to the SLEE. Finally, the receiving step can further include receiving at least one event from a protocol stack.

The method of the invention can be implemented in a machine readable storage, having stored thereon a computer program for routing events in a service logic execution environment (SLEE). Accordingly, the computer program can have a plurality of code sections executable by a machine for causing the machine to perform the steps of receiving at least one event from a service component executing in the SLEE; and, routing each received event to a service component which has registered with the SLEE to receive the routed event.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a service logic execution environment (SLEE) which can solve the deficiencies of the prior art by providing an event routing bus which can facilitate inter-service component event communications. More particularly, unlike conventional implementations of a SLEE in which service components only can receive and process events received from a protocol stack via the SLEE, in the present invention, service components also can receive and process events from other service components and external applications. In this way, service components can be constructed to include specific knowledge of a particular protocol stack. In consequence, the specific knowledge of the particular protocol stack can be removed from the SLEE, thereby reducing the complexity of the SLEE. As a result, in the SLEE of the present invention, new protocol stacks can be added to the intelligent network without requiring a re-coding of the SLEE because service components can be created to include specific knowledge of the added protocol stack. Once dynamically inserted into the SLEE, other service components can access the new protocol stack through the inserted service component via the event routing bus. Unlike prior art intelligent networks in which inter-service component communications are not possible, in the present invention, it is inter-service component communications which makes the simplified addition of new protocol stacks possible.

Figure 1:
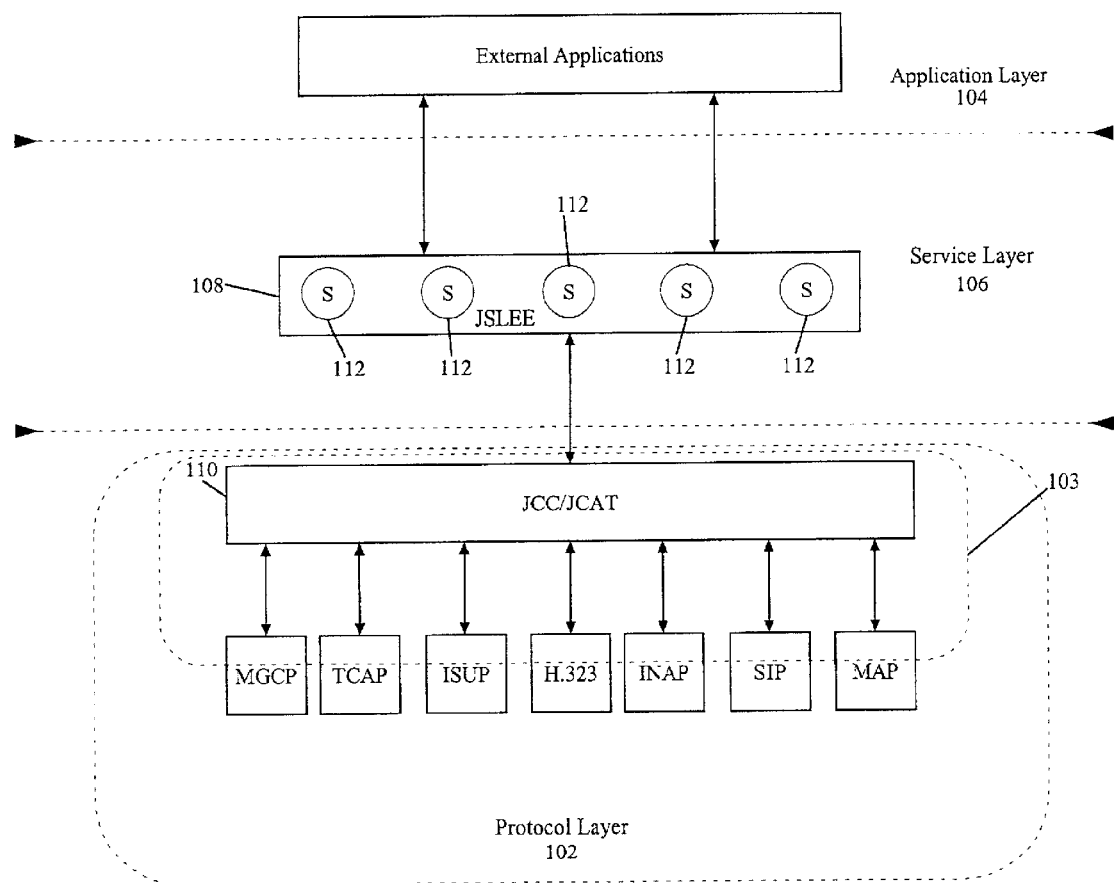
FIG. 1 is a schematic representation of an intelligent network architecture configured in accordance with a conventional JAIN implementation known in the prior art.
Figure 2:
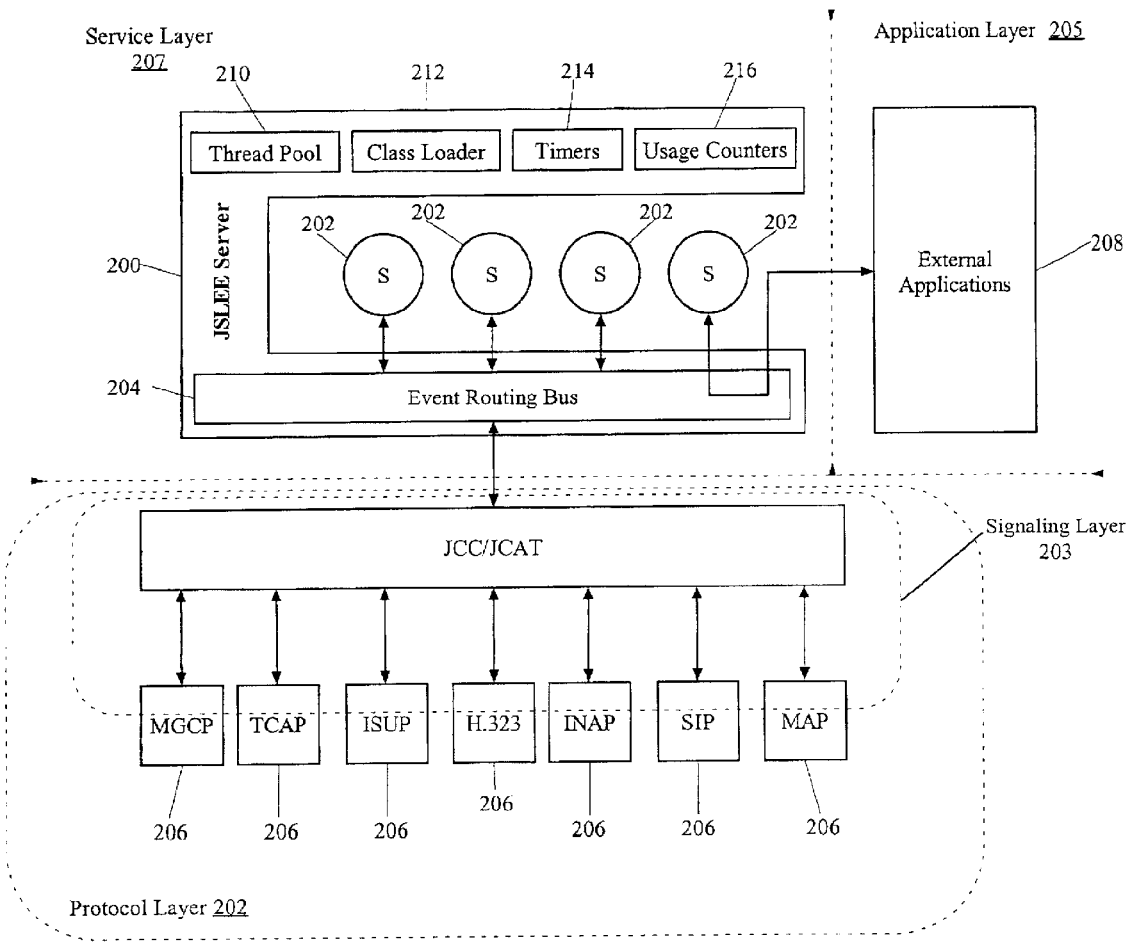
FIG. 2 is a schematic representation of an intelligent network architecture including a service logic execution environment (SLEE) configured in accordance with the inventive arrangements.

The SLEE of the present invention can be configured for compatibility with the Java Advanced Intelligent Network (JAIN) specification. FIG. 2 is a schematic illustration of a JAIN-compliant intelligent network configured in accordance with the inventive arrangements. A JAIN-compliant network configured in accordance with the inventive arrangements can include a protocol layer 202, a signaling layer 203, an application layer 205 and a service layer 207. The application layer 205 can host external third party applications 208. Typical third party applications 208 can suit mass-market demand for services such as virtual private networks (VPNs), inbound services and unified messaging. External third party applications 208 also can include short-lived and niche applications which can be deployed using un-trusted application space deployment technologies such as database lookup interfaces, downloadable mechanisms, and the Parlay API, as are well known in the art. The service layer 207 can include a SLEE server such as a JSLEE Server 200 which can be configured for compatibility with the JAIN specification. The protocol layer 201 can include one or more protocol stacks 206 which can be configured to interact with service components 209 executing in the JSLEE Server 200 through a signaling layer 203. Notably, although FIG. 2 only depicts seven protocol stacks 206, the invention is not limited in regard to the number or type of protocol stacks 206. Rather, JSLEE Server 200 can interact with any protocol stack, for example those protocol stacks configured in accordance with the JAIN specification.

The JSLEE Server 200 also can include several lifecycle management components including a thread pool 210, a class loader 212, timers 214 and usage counters 216. Still, the lifecycle management components are not limited to those shown in FIG. 2. Rather, the lifecycle management components can include components able to perform other lifecycle management responsibilities such as load balancing, for example. In any case, in accordance with the inventive arrangements, individual service components are freed from the overhead of performing lifecycle management and can be used more appropriately in telephony applications.

Notably, as shown in FIG. 2, the thread pool 210 can include a plurality of pre-configured and loaded execution threads which can be allocated by a thread pool management component, on demand, to requesting service components 209 executing in the JSLEE Server 200. When the requesting service components 209 have completed use of the allocated thread, the thread pool management component can de-allocate the allocated thread and can return the de-allocated thread to the thread pool 210 for use by other requesting service components 209 executing in the JSLEE Server.

The class loader 212 can be used by the JSLEE Server 200 to properly load service components 209 for execution in the JSLEE Server 200. In particular, the class loader 212 can identify configuration and loading parameters associated with each service component 209 to be loaded. Subsequently, the class loader 212 can execute the service components 209 using the identified configuration and loading parameters. Finally, the class loader 212 can register the service components 209 with the event routing bus 204 so that events can be transmitted to and from the service components 209 executing in the JSLEE Server 200.

In operation, the JSLEE Server 200 can transmit and receive events to and from the protocol stacks 206 in the protocol layer 201. More particularly, the events can be transmitted and received in an event routing bus 204 included in the JSLEE Server 200. Likewise, service components 209 which are registered with the JSLEE Server can receive protocol stack events directed towards particular ones of the service components 209. More specifically, the event routing bus 204 can route received events to service components 209 which have registered with the JSLEE Server 200 to receive such events.

Importantly, the event routing bus 204 also can receive and transmit messages between service components 209. Specifically, service components 209 can be configured to post messages to the event routing bus 204 and service components 209 can register with the JSLEE Server 200 to receive such posted events from other service components 209. In this way, inter-service component communications can be made possible. Finally, service components 209 can be configured to receive events from external applications 208 via the event routing bus 204. Also, those events which are received from external applications 208 and posted to the event bus 204 can be routed to other service components 209 that have registered to receive such events.

Figure 3:
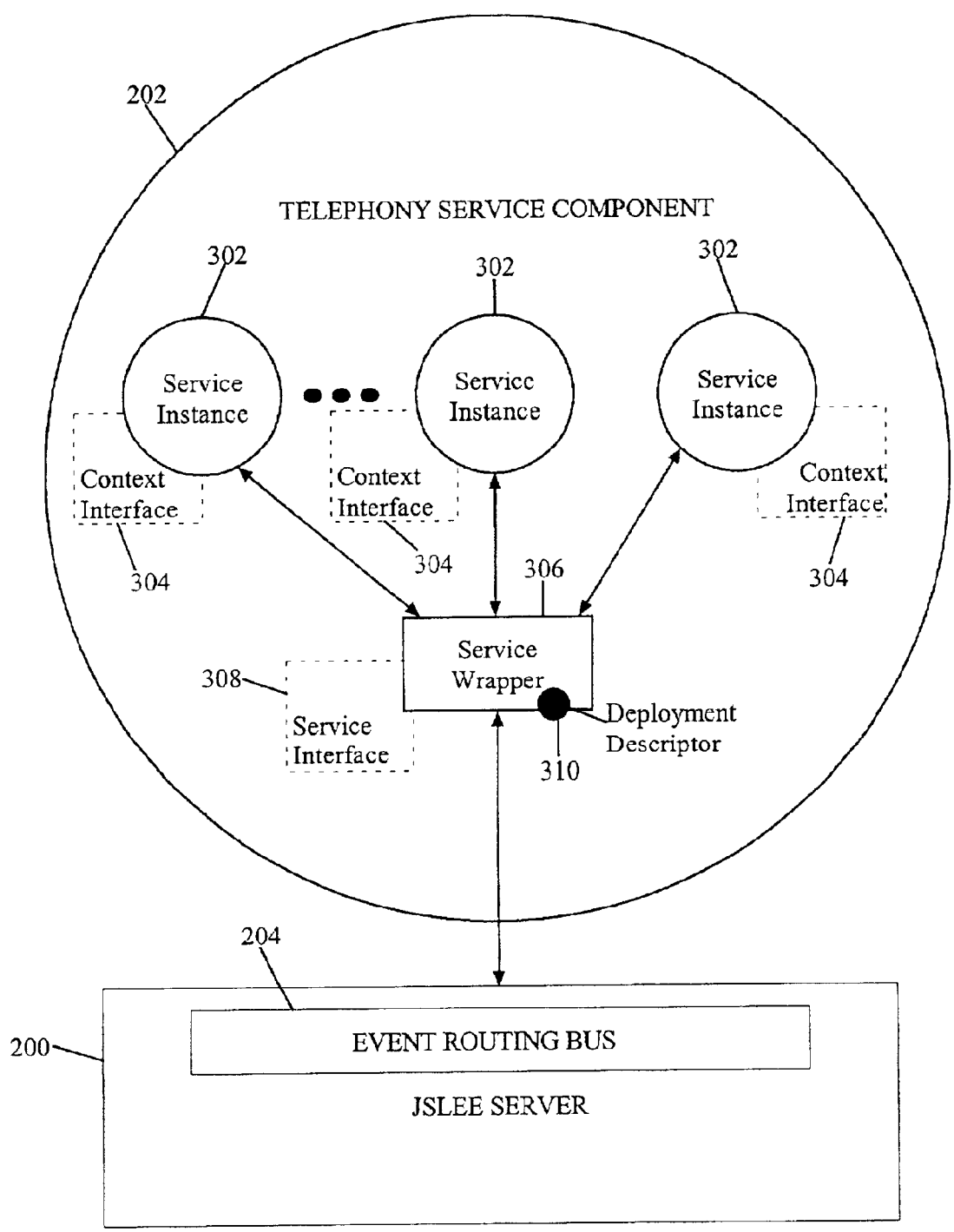
FIG. 3 is a detailed illustration of a service component configured for execution in the SLEE of FIG. 2.

FIG. 3 is a schematic representation of a service component 209 configured for use in the JSLEE Server 200 of FIG. 2. As shown in FIG. 3, the service component 209 can include one or more service instances 302. Service instances 302 are individually instantiated services which can execute in the JSLEE 200. More importantly, each service instance 302 can register with the event routing bus 204 to receive and transmit events to the protocol layer 202 as well as other service components 209. Each service instance 302 can be accessed through service wrapper 306 which insulates the details of the service instance implementation. More particularly, data and method members of the service class can be accessed through a common interface contained in the service wrapper 306.

A deployment descriptor 310 also can be provided. The deployment descriptor 310 can be a document, for instance an XML document, which can describe proper parameters for initially loading an instance of the service component 209 in the JSLEE Server 200. Accordingly, the service instance 302 can register with the event routing bus 204 via the service wrapper 306, and specifically the deployment descriptor 310, to receive and transmit events to the protocol layer 202 and other service components 209. Notably, an interface to the service wrapper 306 can be published to external objects through a service interface 308 which can be included as part of an XML document, for example. Likewise, an interface to each service instance 302 can be included as part of a context interface 304, which also can be published as part of an XML document, for example. Once loaded, service instances 302 can communicate via the event routing bus 204 in the JSLEE Server 200.

The present invention can be realized in hardware, software, or a combination of hardware and software. Moreover, the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A service logic execution environment (SLEE) in an intelligent network model, said network model comprising an application layer and a protocol layer, said SLEE comprising:

a class loader for loading service components in the SLEE, the SLEE registering each loaded service component to receive events directed to particular registered service components; and, an event routing bus for receiving events from the protocol layer and other service components, said event routing bus routing said received events to said particular registered service components executing in the SLEE.

2. The SLEE of claim 1, further comprising:

a thread pool; and, a thread pool manager for allocating threads for use by said loaded service components.

3. The SLEE of claim 1, further comprising:

at least one timer for use by service components in the SLEE.

4. The SLEE of claim 1, further comprising:

at least one usage counter for recording service request response metrics.

5. The SLEE of claim 1, wherein said event routing bus is further configured to receive events from application components which are external to the SLEE and the protocol layer.

6. The SLEE of claim 1, wherein each service component comprises:

at least one service instance; and, a service wrapper for providing an interface to said at least one service instance.

7. The SLEE of claim 1, wherein each service component further comprises:

a deployment descriptor for providing configuration information to said SLEE, wherein said SLEE can use said deployment descriptor to properly configure said service component.

8. The SLEE of claim 1, wherein at least one of said service components contains a protocol stack for managing communications in a communications network.

9. The SLEE of claim 1, wherein said SLEE implements a JAIN Service Logic Execution Environment (JSLEE) interface.

10. A method for routing events in a service logic execution environment (SLEE) comprising the steps of:

receiving at least one event from a service component executing in the SLEE; and, routing each received event to a service component which has registered with the SLEE to receive said routed event.

11. The method of claim 10, wherein said receiving step further comprises the step of:

receiving at least one event from an application component which is external to the SLEE.

12. The method of claim 10, wherein said receiving step further comprises the step of:

receiving at least one event from a protocol stack.

13. A machine readable storage, having stored thereon a computer program for routing events in a service logic execution environment (SLEE), said computer program having a plurality of code sections executable by a machine for causing the machine to perform the steps of:

receiving at least one event from a service component executing in the SLEE; and, routing each received event to a service component which has registered with the SLEE to receive said routed event.

14. The machine readable storage of claim 13, wherein said receiving step further comprises the step of:

receiving at least one event from an application component which is external to the SLEE.

15. The machine readable storage of claim 13, wherein said receiving step further comprises the step of:

receiving at least one event from a protocol stack.

* * * * *